(12) United States Patent
Shimayama et al.

(10) Patent No.: US 8,541,982 B2
(45) Date of Patent: Sep. 24, 2013

(54) BATTERY SYSTEM

(75) Inventors: Hajime Shimayama, Oura-gun (JP); Koichi Saruhashi, Oura-gun (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 439 days.

(21) Appl. No.: 13/018,907

(22) Filed: Feb. 1, 2011

(65) Prior Publication Data
US 2011/0210702 A1  Sep. 1, 2011

(30) Foreign Application Priority Data

Feb. 26, 2010  (JP) ................................ 2010-042002

(51) Int. Cl.
*H02J 7/14*  (2006.01)
(52) U.S. Cl.
USPC ............................. 320/134; 320/135; 320/136
(58) Field of Classification Search
USPC .................. 320/134–136; 307/43–46, 64–66
See application file for complete search history.

(56) References Cited

U.S. PATENT DOCUMENTS 8,350,521 B2 * 1/2013 Reineccius ................... 320/101
2011/0221383 A1 * 9/2011 Uehashi et al. ............... 320/101
2011/0298626 A1 * 12/2011 Fechalos et al. .............. 340/664
2012/0197560 A1 * 8/2012 Kuhns et al. .................... 702/60

FOREIGN PATENT DOCUMENTS

JP  2006-149037 A  6/2006

* cited by examiner

*Primary Examiner* — Richard V Muralidar
(74) *Attorney, Agent, or Firm* — Westerman, Hattori, Daniels & Adrian, LLP

(57) ABSTRACT

A battery system including an assembled battery, a charge mode for charging the assembled battery and a discharge mode for converting electric energy charged in the assembled battery to AC power having the same or substantially the same frequency as a grid and supplying the AC power to a power supply line through which the grid and a load are connected further including a current detector for detecting current supplied to the load, and a control device for calculating an average power usage of past several days based on current being detected by the current detector, and converting the amount of electric power corresponding to the difference between the average power usage and a power usage based on the current value from the current detector to the AC power from the assembled battery to the load in the discharge mode to supply the AC power to the power supply line.

9 Claims, 3 Drawing Sheets

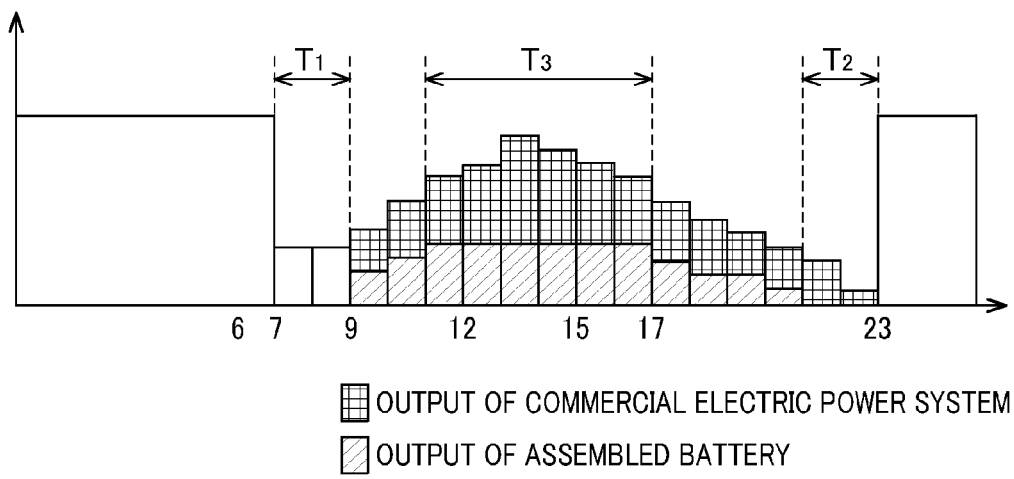
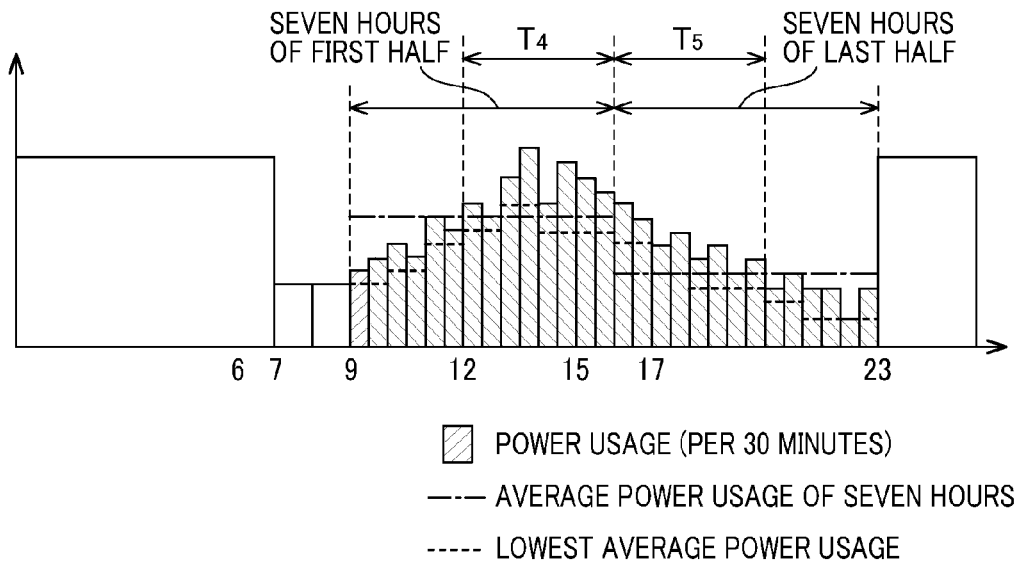

BATTERY SYSTEM

INCORPORATION BY REFERENCE

The present application claims priority under 35 U.S.C. §119 to Japanese Patent Application No. 2010-042002 filed on Feb. 26, 2010. The content of the application is incorporated herein by reference in its entirety.

BACKGROUND OF THE INVENTION

1. Field of the Invention

The present invention relates to a battery system having a chargeable assembled battery.

2. Description of the Related Art

According to a known system using a battery connected to a commercial electric power system, the battery is charged from the commercial electric power system in a specific time zone in which an electrical utility rate (electric power charge) is low because of a time-of-day electric power charging contract or a midnight electric power contract, and the thus-charged rechargeable battery is concentrically discharged in the daytime, particularly in a time zone in which the amount of used power (hereinafter referred to as "power usage") is maximum, thereby purveying electric power (for example, see JP-A-2006-149037).

There is the following concern about the power usage. That is, the necessary electric power greatly varies in accordance with ambient temperature, a time zone or the like. When the necessary electric power is larger than electric energy to be discharged, the capacity of the rechargeable battery is short, and when the necessary electric power is smaller than the electric energy to be discharged, electric power discharged from the battery reversely flows to the commercial electric power line. Therefore, a method of efficiently discharging the battery while the electric power charged in the battery is matched with the power usage.

SUMMARY OF THE INVENTION

The present invention has been implemented in view of the foregoing situation, and has an object to provide a battery system in which discharge power from a battery is suitably controlled in accordance with variation of electric power to efficiently use electric power of the battery in the construction that commercial electric energy is charged into the battery and the battery is discharged in a time zone in which the electric power usage is large.

In order to attain the above object, a battery system including an assembled battery having a plurality of battery modules, a charge mode for charging the assembled battery, and a discharge mode for converting electric energy charged in the assembled battery to AC power having the same or substantially the same frequency as a grid and supplying the AC power to a commercial power line through which the grid and a load are connected, comprises: a current detector for detecting current supplied to the load; and a control device for comparing an average power usage of past several days based on current detected by the current detector with a power usage based on current being detected by the current detector, and permitting or prohibiting discharge from the assembled battery to the load on the basis of a comparison result.

In the above battery system, the control device controls the amount of electric power to be discharged from the assembled battery to the load in accordance with the power usage based on the current.

In the above battery system, the control device calculates a difference between the average power usage and the power usage, discharges the electric energy from the assembled battery corresponding to the calculated difference, and converts the electric energy to the load as AC power in the discharge mode when the power usage is larger than the average power usage.

In the above battery system, the control device controls the assembled battery to discharge electric power corresponding to (0.9×a lowest average power usage) when the power usage is larger than the average power usage.

In the above battery system, the control device divides a period of a discharge mode into a plurality of sections, and compares the power usage of each section with the average power usage.

In the above battery system, the control device interrupts electric power supplying from the assembled battery to the load when the power usage of the section is lower than the average power usage.

In the above battery system, the average power usage is determined on the basis of power usages of some sequential sections out of the plural sections, and the average power usage is used to be compared with each of the power usages of the corresponding sequential sections.

In the above battery system, the average power usage comprises an average power usage of at least each of first and half periods to which the discharge mode period is divided, and is used for the comparison with the amount of electric power supplied to the load during the corresponding period of the first and second periods.

In the above battery system, the control device stores a predetermined operating period of the load with the operating period being divided into plural sections, stores the average power usage of past several days of power supplied to the load during the operating period every section, and supplies the power corresponding to the average power usage stored in accordance with the predetermined operating period of the load from the assembled battery every section.

According to the present invention, the electric energy charged with commercial power is discharged in conformity with variation of daily power usage (the amount of used power), so that reverse power flow to a grid can be prevented and charged power can be efficiently used.

BRIEF DESCRIPTION OF THE DRAWINGS

FIGS. 2A and 2B are graphs showing variations of electric power usage and a discharge amount.

DETAILED DESCRIPTION OF THE PREFERRED EMBODIMENT

An embodiment according to the present invention will be described hereunder with reference to the accompanying drawings.

Figure 1:
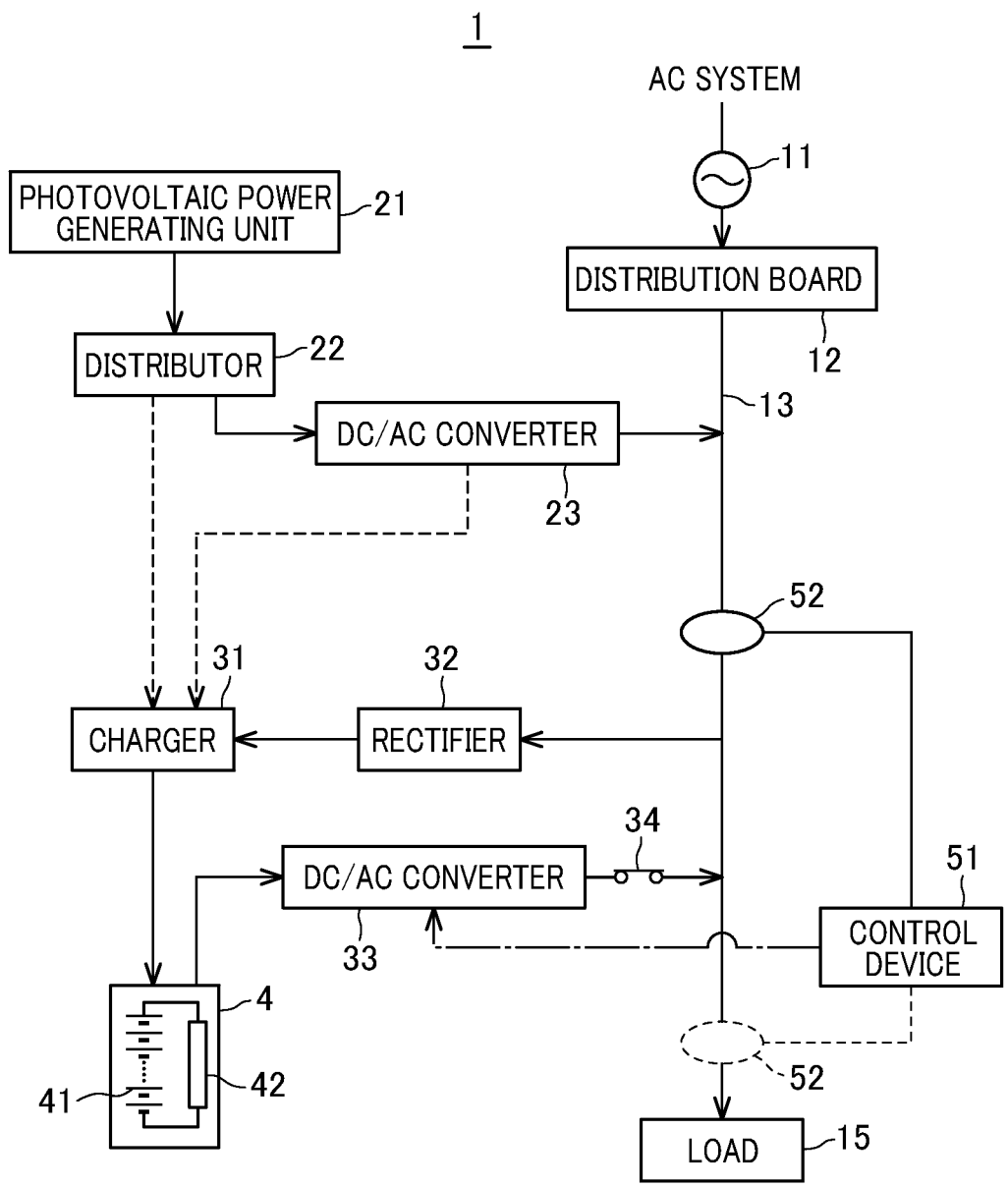
FIG. 1 is a diagram showing the construction of a battery system according to an embodiment of the present invention.

FIG. 1 is a diagram showing the construction of a battery system 1 according to an embodiment to which the present invention is applied.

The battery system 1 shown in FIG. 1 has a commercial AC power line 11 supplied from an electric power company and a photovoltaic power generating unit 21 as DC power sources, and these power is supplied to a load 15 through a wire (or power supply line) at the downstream side of a distribution board 12. The battery system 1 has an assembled battery 4 having a battery module 41. The assembled battery 4 is charged by power of the commercial electric power line 11 or power generated by the photovoltaic power generating unit 21, and also power discharged from the assembled battery 4 is supplied to the wire 13.

The assembled battery 4 contains plural battery modules 41 which are mutually connected to one another in series and/or in parallel, and a controller 42 for monitoring the temperature and voltage of the battery modules 41. The battery modules 41 are secondary (chargeable) battery modules such as lithium ion secondary cells, nickel hydride secondary cells or the like, and this embodiment adopts the lithium ion secondary battery modules.

The controller 42 detects the temperature of the battery modules 41, interrupt current supply when the detected temperature exceeds a predetermined value, detects the voltage between both the ends of the plural battery modules 41 connected to one another in series, calculates RSOC (Relative State Of Charge; residual capacity ratio) based on the detected voltage value, outputs data of RSOC, etc.

Furthermore, a distributor 22 is connected to the photovoltaic power generating unit 21, and power generated by the photovoltaic power generating unit 21 is distributed and output to a DC/AC converter 23 and/or a charger 31. The DC/AC converter 23 boosts electric energy output from the photovoltaic power generating unit 21 to a voltage necessary to obtain AC power having the same or substantially the same frequency as the commercial electric power line 11, and then the DC/AC converter 23 converts the boosted voltage to the AC power and outputs the converted AC power to the wire 13. The DC/AC converter 23 may output boosted DC power to the charger 31.

The charger 31 for charging the assembled battery 4 is connected to the wire 13 through a rectifier 32. The rectifier 32 outputs to the charger 31 DC power obtained by rectifying and regulating AC power of the wire 13, and the charger 31 charges the assembled battery 4 by the DC power input from the rectifier 32.

Furthermore, as indicated by broken lines in FIG. 1, the charger 31 is connected the distributor 22 and the DC/AC converter 23 and supplied with DC power generated by the photovoltaic power generating unit 21 from the distributor 22 and with the boosted DC power from the DC/AC converter 23. The charger 31 charges the assembled battery 4 by the power input from the distributor 22 and the DC/AC converter 23.

The output side of the assembled battery 4 is connected to the wire 13 through the DC/AC converter 33 and a magnet switch 34, and the assembled 4 can disconnect from the commercial electric power line 11 together with the DC/AC converter 33. The DC/AC converter 33 boosts the power charged in the assembled battery 4 to a voltage necessary to obtain AC power having the same or substantially the same frequency as the commercial electric power line 11, converts this voltage to AC power and then outputs the converted AC power to the wire 13.

The battery system 1 supplies desired use power of the load 15 by using both the power generated by the photovoltaic power generating unit 21 and the power of the commercial electric power line 11 in a time zone of daytime in which the photovoltaic power generating unit 21 generates electric power. Furthermore, the battery system 1 executes the power supply while switching a discharge mode for supplying the use power of the load 15 with power discharged by the assembled battery 4 in addition to the power of the commercial electric power line 11 or the power of the photovoltaic power generating unit 21 and the commercial electric power line 11, and a charge mode for charging the assembled battery 4. The charge mode contains a photovoltaic power charge mode for charging the assembled battery 4 with the electric energy generated by the photovoltaic power generating unit 21 and a nighttime charge mode for charging the assembled battery 4 by the commercial electric power line 11 in a time zone in which the electrical utility rate is low on the basis of a time-of-day electric power charging contract or a midnight electric power contract for power charging.

The control device 51 controls the charger 31 and the magnet switch 34 to switch the discharge mode and the charge mode to each other. Furthermore, the control device 51 adjusts the times of starting and finishing the charting mode on the basis of the present time counted by built-in RTC (not shown), and executes the switching operation between the photovoltaic power charge mode and the nighttime charge mode.

A current detector 52 for detecting current flowing through the load 15 is provided to the wire 13 at the downstream side of the distribution board 12, and the current detector 52 is connected to the control device 51. The DC/AC converter 33 is connected to the control device 51. In the discharge mode, the control device 51 calculates the power usage of the load 15 on the basis of the current value detected by the current detector 52, controls the DC/AC converter 33 on the basis of the calculated power usage, and adjusts the discharge from the assembled battery 4.

The current detector 52 is provided between a connection point to which current is input from the DC/AC converter 23 and a connection point to which current is input from the DC/AC converter 33 as shown in FIG. 1. However, the current detector 52 may be provided at the downstream side of the connection point to which current is input from the DC/AC converter 33 as indicated by a broken line in FIG. 1.

The battery system 1 adjusts the amount of electric power discharged from the assembled battery 4 on the basis of the power usage of the load 15 during execution of the discharge mode. The operation of the battery system 1 in the discharge mode will be described hereunder. In the following description, the time zone of nighttime in which the nighttime discharge mode is executed is set to 23 o'clock to 7 o'clock, and the time zone of daytime in which the discharge mode is executed is set to 9 o'clock to 23 o'clock.

The battery system 1 controls the amount of electric power discharged from the assembled battery in accordance with the power usage of the load 15 under the control of the control device 51.

FIGS. 2A and 2B are graphs showing variations of the power usage and the discharge amount. In FIGS. 2A and 2B, the ordinate axis represents the amount of electric power, the abscissa axis represents time lapse, and the numerals on the abscissa axis represent the time. FIG. 2A shows the discharge amount of the assembled battery 4 with respect to the power usage, a shaded portion represents the output of the commercial electric power line 11 and a hatched portion represents the output of the assembled battery 4 (DC/AC converter 33). The total of the shaded portion and the hatched portion corresponds to the whole power usage. FIG. 2B shows the relationship between a control parameter determined from the power usage (lowest average power usage LP, average power usage MP (7) over seven hours) and the power usage.

The control device 51 also provides a non-charge/non-discharge time zone T1 between the time zone of nighttime and the time zone of daytime (7 o'clock to 9 o'clock). The charging is not executed in this time zone because this time zone is not a time zone in which the electric power charge is low because of the time-of-day power charging contract or the nighttime power charging contract. Furthermore, the time zone of 7 a.m. to 9 a.m. of weekday is local maximum in power demand, and thus the residual capacity of the assembled battery 4 is reduced more early when discharge is executed in this time zone. Therefore, in this embodiment, neither charging nor discharging is executed in the time zone T1 (7 o'clock to 9 o'clock).

When the time zone of daytime is started, the control device 51 determines the amount of electric power output from the DC/AC converter 33 on the basis of the whole power usage, and controls the DC/AC converter 33 to execute discharging. Specifically, the control device 51 does not output no power from the DC/AC converter 33 when the whole power usage is less than a preset lower limit value (for example, 300 W). The lower limit value is preset on the basis of the rating or the like of the DC/AC converter 33, and stored in the control device 51. For example, the whole power usage is low in the time zone T2 of FIG. 2A, and thus the DC/AC converter 33 does not discharge.

The control device 55 stores the upper limit value (rating) of the DC/AC converter 33 in advance, and when the whole power usage exceeds the rating output of the DC/AC converter 33, the control device 55 controls the DC/AC converter 33 to execute the rating output. For example, in a time zone T3 of FIG. 2A, a state that the whole power usage is high is continued over six hours, and the DC/AC converter 33 continues the rating output.

When the whole power usage is not less tan the lower limit value (for example, 300 W) and also is not more than the rating output of the DC/AC converter 33, the control device 51 controls the output of the DC/AC converter 33 on the basis of past power usages.

The control device 51 records the whole power usage per 30 minutes (every 30 minutes) under the discharge mode including a case where the whole power usage is less than the lower limit value and a case where the whole power usage exceeds the rating output. The value of the power usage is stored in a non-volatile memory (not shown) contained in the control device 51, for example.

The control device 51 calculates the lowest average power usage per hour (hereinafter, LP) from the recorded power usage per 30 minutes every time zone. The lowest average power usage LP is a value obtained by averaging the lowest value of the power usage of arbitrary one hour in the time zone of the discharge mode over plural days. For example, when the lowest average power usage LP is calculated for one hour from 9 a.m. to 10 a.m., the control device 51 adds the lowest value of the power usage between 9 a.m. to 10 a.m. on some day, the lowest value of the power usage between 9 a.m. to 10 a.m. on the next day and the lowest value of the power usage between 9 a.m. to 10 a.m. on the further next day, and calculates the average value of these lowest values. The power usage is recorded every 30 minutes, and thus the lowest value of the power usage of one hour is any one of the power usage from 9 a.m. to 9:30 a.m. and the power usage from 9:30 a.m. to 10 a.m. In FIG. 2B, the lowest average power usage LP is represented by a broken line.

When the power usage per 30 minutes is recorded over a sufficient number of days, the control device 51 calculates the lowest average power usage LP by using the record of the power usage of the latest seven days.

Furthermore, the control device 51 calculates the average power usage every hour (hereinafter referred to as MP) from the power usage per 30 minutes. The average power usage MP is an average value of the power usage of each section when the discharge mode time zone is sectioned every hour. The control device 51 calculates the average value of the power usage of one hour containing the present time. For example, at 10 a.m., the average value between the power usage from 9 a.m. to 9:30 a.m. and the power usage from 9:30 a.m. to 10 a.m. is calculated, and this average value is set as the average power usage MP.

Furthermore, the control device 51 equally divides the time zone of the discharge mode into two zones, that is, first and last half time zones (sections), and calculates the average power usage of each time zone. In this embodiment, the time zone of 9 o'clock to 23 o'clock is divided into the first half time zone of seven hours and the last half time zone of seven hours, and the average power usage of seven hours (hereinafter referred to as MP(7)) is calculated. The average power usage of seven hours MP(7) is obtained by adding the power usages recorded every 30 minutes over seven hours to calculate the average value of the power usages per 30 minutes and also averaging the thus-calculated average values per seven hours over several days. In FIG. 2B, the average power usage MP(7) of seven hours is represented by a one-dotted chain line. When the power usage per 30 minutes is recorded over a sufficient number of days, the control device 51 calculates the average power usage of seven hours MP(7) by using the record of the power usages of the latest seven days.

Then, the control device 51 compares the average power usage of seven hours MP(7) of the time zone containing the present time with the average power usage MP of current one hour. The average power usage of seven hours MP(7) is an average value over a long time, however, the average power usage MP is a substantially present power usage. Therefore, on the basis of the comparison between the average power usage MP and the average power usage of seven hours MP(7), it can be determined whether the power usage at the present time is peak or not.

That is, when the average power usage MP is larger than the average power usage of seven hours MP(7), the time zone concerned has a larger power usage than the other time zones. In the example of FIG. 2B, the average power usage MP is larger than the average power usage of seven hours MP(7) for four hours from 12 o'clock to 16 o'clock out of the first half seven hours and four hours from 16 o'clock to 20 o'clock out of the last half seven hours, and these time zones correspond to the peak time zones of the power usage.

On the other hand, when the average power usage MP is smaller than the average power usage of seven hours MP(7), the time zone concerned has a smaller power usage than the other time zones. Therefore, the time zone concerned is out of the peak of the power usage.

The control device 51 compares the average power usage of seven hours MP(7) with the average power usage MP, and controls the DC/AC converter 33 to execute the discharge from the assembled battery 4 in the time zone in which the power usage is peak. In this case, the control device 51 sets the amount of electric power to be discharged from the DC/AC converter 33 to 0.9 time of the lowest average power usage LP of the time zone concerned.

Furthermore, in the time zone out of the peak time zone of the power usage, the control device 51 does not execute the discharge from the assembled battery 4. This is because when the average power usage MP is small, there is a concern that the power usage is lower than the power to be discharged from the assembled battery 4 and thus reverse power flow occurs.

This series of operations will be described with reference to a flowchart.

Figure 3:
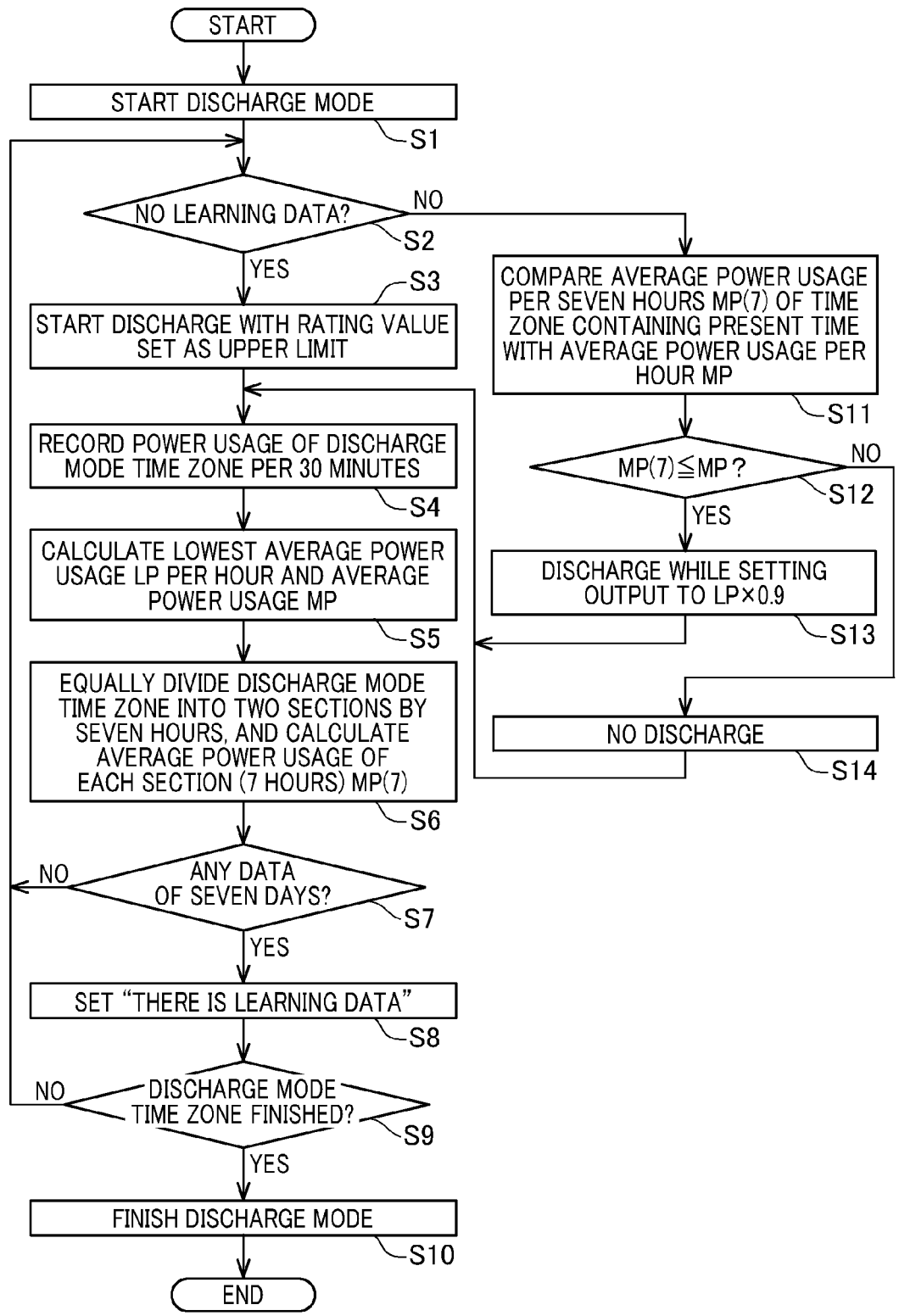
FIG. 3 is a flowchart showing a discharge mode.

FIG. 3 is a flowchart showing the operation of the control device 51 in the discharge mode.

When the time enters the time zone of the discharge mode (the time zone of daytime), the control device 51 starts the operation of the discharge mode (step S1), and determines whether there is any leaning data of past power usage (step S2). Here, when there is no learning data (step S2; Yes), the control device 51 starts discharging of power of the assembled battery 4 with the rating value of the DC/AC converter 33 being set to the upper limit (step S3). Furthermore, the control device 51 records the power usage of the load 15 every 30 minutes from the time when the discharge mode is started, and stores the recorded power usage into a non-volatile memory (not shown) of the control device 51 (step S4).

Subsequently, the control device 51 calculates the lowest average power usage LP per hour and the average power usage MP on the basis of the record of the power usage, and stores them into the non-volatile memory (step S5). Furthermore, the control device 51 calculates and stores the average power usage of each section (each of the first and last half sections) when the discharge mode time zone is equally divided into the first and last half sections (step S6).

Then, the control device 51 determines whether the lowest average power usage LP, the average power usage MP and the average power usage of seven hours MP(7) could be calculated on the basis of the record of the power usages of the latest seven days containing the current day in steps S4 to S6 (step S7). When there is no record of the power usages of the latest seven days, the control device 51 returns to the step s2, and when the calculation is performed on the basis of the record of the power usages of the latest seven days, the set value concerning the learning data is changed to "there are learning data" (step S8).

Thereafter, the control device 51 determines whether the present time reaches the end time of the discharge mode time zone (step S9). When the discharge mode time zone is finished, the control device 51 finishes the discharge mode and shifts to the nighttime charge mode (step S10). When the present time does not reach the end time of the discharge mode, the control device 51 returns to the step S2.

As described with respect to the steps S2 to S8, when there is no record of the power usage for a past sufficient period (for seven days), the control device 51 records the power usage with the rating value of the DC/AC converter 33 being set to the upper limit while making the DC/AC converter 33 discharge.

On the other hand, when there is learning data of the past power usages (step S2; No), the control device 51 compares the average power usage of seven hours MP(7) of the time zone containing the present time with the average power usage MP (step S11). When the average power usage of seven hours MP(7) is not more than the average power usage MP (step S12; Yes), the control device 51 sets the output value of the DC/AC converter 33 to 0.9 time of the lowest average power usage LP of the time zone concerned, and makes the DC/AC converter 33 discharge the power corresponding to the 0.9-time lowest average power usage LP (step S13). Thereafter, the control device 51 shifts to step S4. When the average power usage of seven hours MP(7) is more than the average power usage MP (step S12; No), the control device 51 controls the DC/AC converter 33 not to output (step S14), and shifts to step S4. Here, when the average power usage of seven hours MP(7) is not more than the average power usage MP (step S12; Yes), in place of the discharge of the 0.9-time lowest average power usage LP from the DC/AC converter 33, the control device 51 may calculate the difference between the average power usage MP and the average power usage of seven hours MP(7), and control the DC/AC converter 33 to convert the power corresponding to the calculated difference to AC power and discharge the thus-converted AC power in the discharge mode.

As described above, according to this embodiment to which the present invention is applied, the battery system 1 has the assembled battery 4 which is rechargeably constructed by assembling plural battery modules 41, and has a charge mode for charging the assembled battery 4 and a discharge mode for converting DC power charged in the assembled battery 4 to AC power having the same or substantially the same frequency as the system and supplying the AC power to a wire 13 for connecting the system and the load 15. The battery system 1 is further provided with the current detector 52 for detecting current supplied to the load 15, and the control device 51 for calculating the average power usage of past several days based on the current detected by the current detector 52, comparing the thus-calculated average power usage and the power usage based on the current detected by the current detector 52 (or calculating the difference between the average power usage and the power usage) to determine whether the discharge from the assembled battery 4 through the DC/AC converter 33 to the load is permitted or prohibited. If the discharge is permitted, the power corresponding to (0.9×the lowest average power usage LP) or the power corresponding to the difference between the power usage and the average power usage of past several days is discharged from the assembled battery 4 through the DC/AC converter 33 to the load 15. Therefore, the present power usage (the amount of current used power) can be accurately identified on the basis of the average power usages of past several days, and the discharge can be surely controlled, for example by making the assembled battery 4 discharge only in the peak time zone, thereby performing peak-cut of the commercial electric power line 11. Accordingly, the power charged in the assembled battery 4 can be efficiently discharged in conformity with the variation of the power usage, and the reverse power flow to the commercial electric power system can be prevented.

The control device 51 divides the discharge-mode execution period (discharge-mode time zone) into plural one-hour sections, determines the amount of used power (power usage) of the load 15 in each section and compares the thus-determined amount of used power (power usage) with the amount of average used power (average power usage) every section. Therefore, the discharge from the assembled battery 4 can be controlled while following variation of the power usage, and the load of the processing can be reduced by suppressing the frequency of the calculation processing concerning the power usage.

Furthermore, the control device 51 does not supply power from the assembled battery 4 to the load 15 (i.e., interrupts power supply from the assembled battery 4 to the load 15) when the power usage in each section is lower than the average power usage, and thus the reverse power flow from the assembled battery 4 to the commercial electric power line 11 can be prevented.

Furthermore, the average power usage is calculated on the basis of the power usages of some sequential sections out of plural sections, and it is used to be compared with the power usages in the corresponding some sections. Therefore, the power usages of past several days can be suitably compared with the current power usage while excluding the influence of the variation of the time zone, and the power charged in the assembled battery 4 can be suitably discharged in conformity with the variation of the power usage.

The average power usage comprises average power usages of at least the first and last half periods to which the discharge mode period is divided, and is used for the comparison with the amount of electric power supplied to the load 15 during the corresponding period. Therefore, the relationship between the current power usage and the variation of the power usage based on the time zone is clear, and it can be accurately determined whether the current power usage is peak or not, for example. Accordingly, the discharge can be suitably performed in accordance with the variation of the power usage based on the time zone.

Specifically, the load 15 is an air conditioner or the like, and an operation time may be set in advance. For example, the operating period (time zone) of the air conditioner is set, and the air conditioner is operated according to the operation time. When the set operation time is stored in the control device 51, the control device 51 may store the predetermined operating period of the load 15 with the operating period being divided into plural sections, store the average power usage of past several days of power supplied to the load 15 during the operating period every section, and supply the power corresponding to the average power usage stored in accordance with the predetermined operating period of the load 15 from the assembled battery 4 every section. In this case, the discharge of the assembled battery 4 is controlled on the basis of the power usage in the operating period of the load 15, whereby the discharge can be efficiently and suitably performed.

The present invention is not limited to the above embodiment, and various modifications and alterations may be made without departing from the subject matter of the present invention. For example, in the above embodiment, the control device 51 records the power usage (the amount of used power) per 30 minutes on a 30-minute basis). However, the present invention is not limited to this embodiment, and the power usage may be recorded on a one-minute basis. In this case, the average power usage MP may be determined on the basis of the detection value of the current detector 52 detected on a one-minute basis, higher real-time control can be performed with respect to the amount of electric power discharged from the assembled battery 4. Furthermore, the average power usage MP is not limited to the average value per hour, and the average power usage of every three hours may be set as the average power usage MP. In this case, in addition to the merit that the frequency of the calculation processing is reduced and thus the processing load is reduced, there is another merit that the variation of the output of the assembled battery 4 is small. For example, the average value of every three hours is set as the average power usage MP on holidays on which the variation of the power usage in accordance with the time zone is small, and the average value of every hour is set as the average power usage MP in weekdays on which the variation of the power usage in accordance with the time zone is large, whereby the effect is enhanced.

Furthermore, the control device 51 calculates the lowest average power usage LP and the average power usage of seven hours MP(7) on the basis of the record of the power usages of the latest seven days. However, the present invention is not limited to this embodiment, and data to be used may be changed in accordance with the day of the week. Specifically, when the discharge mode is executed, the lowest average power usage LP and the average power usage of seven hours MP(7) may be calculated by using the record of the power usage of the past same day of the week, or by using the record of the power usage of a past weekday on a weekday and using the record of the power usage of a past holiday on a holiday. Furthermore, the control device 51 may divide the time zone of the discharge mode into three or four sections and calculate the average power usage of each section in place of the average power usage of seven hours MP(7).

Furthermore, in the above embodiment, the discharge mode in which the assembly battery 4 discharges is executed in the time zone of daytime. However, when the load 15 is a water heater or the like which is used during the night, the assembled battery 4 may be charged with power generated by the photovoltaic power generating unit 21 in the daytime, and the discharge mode may be executed in the nighttime in conformity with the operation time of the load 15.

The type of the load 15, the specification and detailed constructions of the respective parts of the battery system 1, etc. may be arbitrarily changed or modified.

What is claimed is:

1. A battery system that includes a assembled battery having a plurality of battery modules, a charge mode for charging the assembled battery and a discharge mode for converting electric energy charged in the assembled battery to AC power having the same or substantially the same frequency as a grid and supplying the AC power to a commercial power line through which the grid and a load are connected, comprising:
   a current detector for detecting current supplied to the load; and
   a control device for comparing an average power usage of past several days based on current detected by the current detector with a power usage based on current being detected by the current detector, and permitting or prohibiting discharge from the assembled battery to the load on the basis of a comparison result.

2. The battery system according to claim 1, wherein the control device controls the amount of electric power to be discharged from the assembled battery to the load in accordance with the power usage based on the current.

3. The battery system according to claim 2, wherein the control device calculates a difference between the average power usage and the power usage, discharges the electric energy from the assembled battery corresponding to the difference, and converts the electric energy to the load as AC power in the discharge mode when the power usage is larger than the average power usage.

4. The battery system according to claim 1, wherein the control device controls the assembled battery to discharge electric energy corresponding to (0.9×a lowest average power usage) when the power usage is larger than the average power usage.

5. The battery system according to claim 1, wherein the control device divides a period of a discharge mode into a plurality of sections, and compares the power usage of each section with the average power usage.

6. The battery system according to claim 5, wherein the control device supplies no electric power to the load when the power usage of the section is lower than the average power usage.

7. The battery system according to claim 6, wherein the average power usage is determined on the basis of power usages of some sequential sections out of the plural sections, and the average power usage is used to be compared with each of the power usages of the corresponding sequential sections.

8. The battery system according to claim 6, wherein the average power usage comprises an average power usage of at least each of first and half periods to which the discharge mode period is divided, and is used for the comparison with the amount of electric power supplied to the load during the corresponding period of the first and second periods.

9. The battery system according to claim 1, wherein the control device stores a predetermined operating period of the load with the operating period being divided into plural sections, stores the average power usage of past several days of power supplied to the load during the operating period every section, and supplies the power corresponding to the average power usage stored in accordance with the predetermined operating period of the load from the assembled battery every section.

* * * * *